Feb. 18, 1964 A. AMANZIO 3,121,659
APPARATUS FOR PRODUCING FIBER REINFORCED CEMENTITIOUS STRUCTURE
Filed July 9, 1959 3 Sheets-Sheet 1

INVENTOR.
Adalberto Amanzio
BY
Michael S. Striker
Attorney

FIG. 2
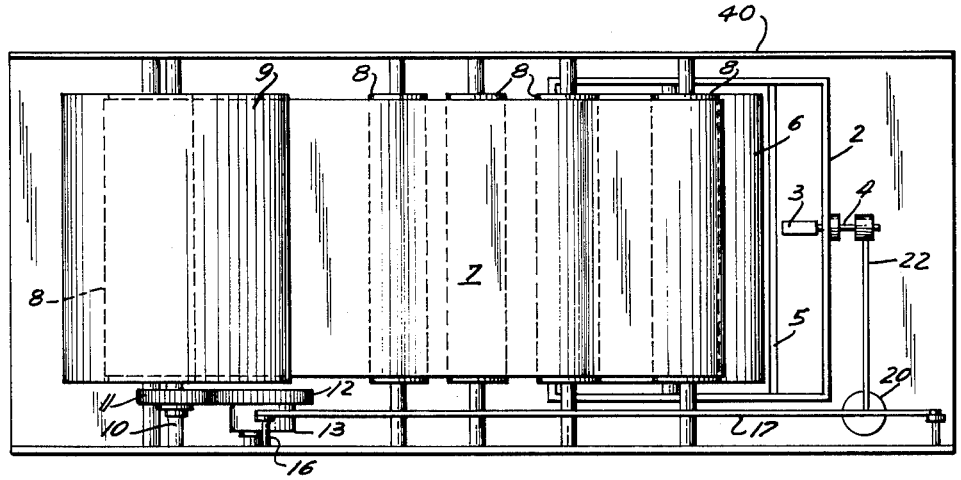
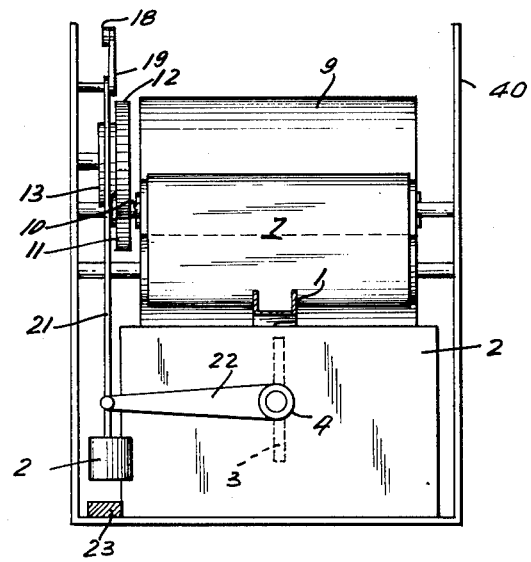
FIG. 3

INVENTOR.
Adalberto Amanzio
BY
Michael S. Striker
Attorney

United States Patent Office 3,121,659
Patented Feb. 18, 1964

3,121,659
APPARATUS FOR PRODUCING FIBER REINFORCED CEMENTITIOUS STRUCTURE
Adalberto Amanzio, Sullivan 199–701,
Mexico City, Mexico
Filed July 9, 1959, Ser. No. 825,936
2 Claims. (Cl. 162—284)

The present invention relates to fiber-reinforced cementitious structures, and more specifically to sheets and the like made of a mixture of a cementitious material such as Portland cement and a fibrous material such as asbestos.

Among the various processes employed for making asbestos-cement structures, the so-called wet-machine process or Hatschek process has many well-known advantages which recommend its use. In this process, the dry ingredients from which the reinforced cementitious structure is to be produced are mixed with water to form a viscous slurry which may contain between 10 and 75% of loose asbestos fibers depending on the desired properties of the end product. The balance of the dry mixture consists of Portland cement with aggregate, pigments, and such other addition agents as the use for which the product is to be employed may call for. These non-fibrous ingredients are referred to in this application and the claims by the term "cementitious materials." The amount of water added is such as to permit setting of the Portland cement to form structural elements in which the cementitious material is intended to withstand compressive stresses whereas the fibrous constituent such as asbestos improves the tensile properties. The length of the asbestos fibers employed influences the mechanical properties in a well-known manner.

A very widely used commercial product of the type described is made in the form of structural panels, 8 ft. long and 4 ft. wide, and having a thickness in the range of ⅛ inch to approximately 4 inches. The panels may be waterproofed or otherwise impregnated to make them suitable for outdoor applications. Corrugated sheets are made from flat sheet stock, for instance, by means of molding machines, manual molding systems, or by forming in presses. It has been found that asbestos cement sheets made by the wet-machine process are liable to crack in the corrugating press, and that the flat sheets produced by the process have different mechanical properties in the lengthwise and the crosswise direction.

This mechanical anisotropy of the asbestos-cement sheets produced by the wet-machine process is a recognized shortcoming of the process and is inherent in the apparatus in which the process is commonly performed. The viscous mixture of cementitious and fibrous materials with water is run from the mixing vessel into a vat. During the flow of the mixture into the vat, the elongated asbestos fibers orient themselves in such a manner as to present minimum resistance to the flow of the mixture, that is, they are preferentially aligned in the direction of flow, and this alignment is substantially maintained in the vat because of the viscous nature of the mixture.

A revolving screen is mounted on the vat so as to be partially immersed in the viscous mixture, and carries a layer of the mixture from the vat during rotation. The mixture is partly dewatered on the screen and is then transferred to the nap side of a felt belt from which the layer of approximately 1/100 of an inch thickness is transferred to a rotating roll on which the desired thickness of the final sheet is gradually built up. When this thickness is reached, the tubular sheet formed on the roll is slit axially, removed from the roll, flattened, and permitted to set which may take several weeks. The orientation of the fibers in the cementitious matrix is maintained throughout the entire manufacturing process so that the finished sheet contains preferentially aligned asbestos fibers. The strength of the sheet transverse to the direction of alignment of the asbestos fibers is low.

It is the primary object of the invention to provide a fiber reinforced cementitious structure which shows substantially uniform high strength in all directions.

Another object is the provision of a method of producing such a sheet.

A further object is the provision of apparatus for performing the method.

With these and other objects in view, the present invention provides a fiber reinforced cementitious structure in which a plurality of superimposed layers of cementitious material each have preferentially aligned fibrous particles embedded therein. The direction of preferential alignment of the fibrous particles in one layer is transverse to the direction of alignment of the fibrous particles in another one of the layers superimposed on the first-mentioned layer.

To produce such a structure from a viscous settable mixture of cementitious material and of elongated particles of fibrous material with water, the invention contemplates treating the mixture so as to preferentially align its elongated fibrous particles. A first layer of the mixture having fibrous particles preferentially aligned in a predetermined direction is then deposited on a substrate. A second layer of the mixture is superimposed on the first layer in such a manner that the fibrous particles of the second layer are preferentially aligned in a direction transverse to the direction of preferential alignment of the first layer. The superimposed layers are then jointly set.

A preferred apparatus for carrying out the aforedescribed method includes a container, means for introducing a stream of a viscous mixture of cementitious material and of elongated particles of fibrous material into the container so to form therein a body of the mixture having particles of fibrous material preferentially aligned in the direction of movement of the stream, and means for changing the direction of movement of the stream. The apparatus further comprises means for withdrawing a layer of the mixture from the body thereof in the container.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a plan view of the apparatus of FIG. 1;

FIG. 3 is a front elevation of the apparatus of FIG. 1;

Figure 1:
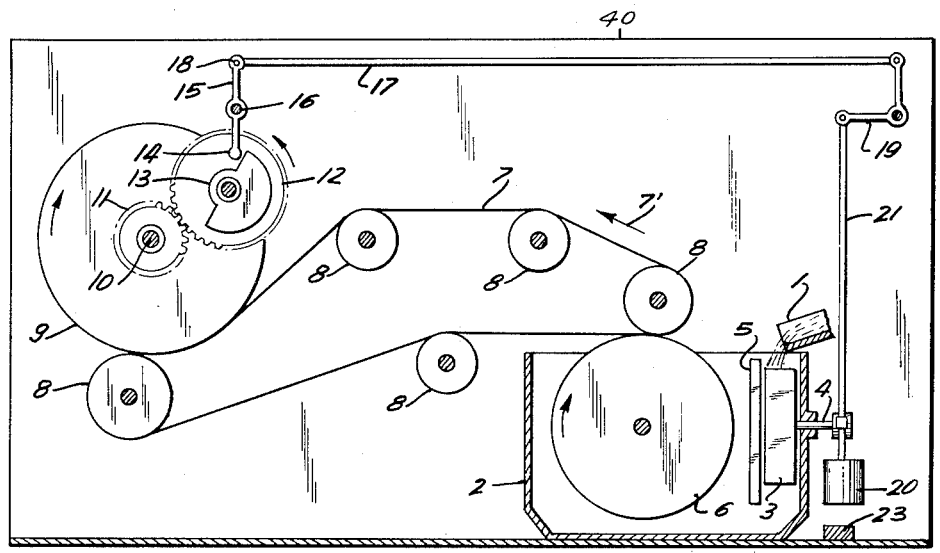
FIG. 1 is a side elevational view of a preferred embodiment of the apparatus of the invention partly in section.

Referring now to the drawings, and more particularly to FIGS. 1–3 and 5, there is shown a supporting framework 40 on which the operating parts of the machine are mounted. Discharge spout 1 serves for discharging a viscous slurry of the mixture of cementitious and fibrous materials with water from a mixing vessel (not shown) into a vat 2. The stream of the mixture flowing from the spout 1 impinges on a baffle 3 which is fixedly mounted on a horizontal shaft 4 rotatedly secured in an end wall of the vat 2. The movable baffle 3 cooperates with the walls of the vat 2 and with a stationary vertical baffle 5 extending from side wall to side wall in the vat 2 in a plane parallel to the plane of rotation of the baffle 3 to define a path for the stream of slurry discharged from the spout 1.

The stationary baffle 5 separates a small compartment in which the baffle 3 operates from the main space of the vat 2 in which a revolving screen 6 is mounted for rotation about a horizontal shaft secured in the side walls of the vat 2. As seen in FIG. 1, the screen 6 is caused to rotate in a clockwise direction by a felt belt 7 which is trained over five rubber-covered support and guide rolls 8 which hold the felt belt 7 in engagement with the revolving screen 6.

Movement of the felt belt 7 in the direction of the arrow 7' is actuated by contact with a cast-iron roll 9 fixedly mounted on a driven shaft 10 which is supported in the frame of the machine. A spur gear 11 is fixedly mounted on the shaft 10 for joint rotation with the roll 9. The spur gear 11 engages a spur gear 12 having a diameter twice the diameter of spur gear 11 so that the gear 12 makes two revolutions during each revolution of the roll 9. A stepped cam disc 13 is fastened concentrically to the spur gear 12. The cam disc 13 has two semi-cylindrical cam face portions of different radius connected by radial cam faces.

The cam disc 13 cooperates with a cam follower 14 mounted on a lever 15 which is pivotally secured on the machine frame by pivot 16. The lever 15 is urged to move in a counterclockwise direction about the pivot 16 by a connecting link 17 having one end rotatably secured to the lever 15 by a pivot pin 18. The other end of the link 17 is pivotally secured to a bell crank lever 19 which is urged into counterclockwise movement by a weight 20 suspended from a rod 21. A crank arm 22 has one end fixedly fastened to the shaft 4 of the movable baffle 3 and another end pivotally secured to the rod 21. Downward movement of the weight 20 is limited by a support 23 mounted on the frame of the machine.

The above described device operates as follows:

The weight 20 moves the rod 21 downward from the position illustrated in the drawing until the weight comes to rest on the support 23. This downward movement of the rod 21 causes the movable baffle 3 to be turned counter-clockwise as seen in FIG. 3 so that the stream of viscous mixture discharged from the spout 1 is directed towards the right. It flows on the bottom of the vat 2 in a direction susbtantially diagonal of the vat from the right corner of the vat shown in FIG. 3.

Downward movement of the rod 21 causes counter-clockwise rotation of the bell crank lever 19 and longitudinal displacement of the connecting link 17 to the left as seen in FIG. 1 with concomitant movement of the cam follower 14 to the right out of engagement with the radial face of the cam disc 13. The cam follower maintains its position, and the baffle 3 remains inclined from the upper left to the lower right, as seen in FIG. 3, until the other radial face of the cam disc 13 engages the cam follower 14 and shifts it to the left, thereby lifting the weight 20 and tilting the movable baffle 3 through the vertical position illustrated into an inclined position in which the baffle extends in a plane extending from the upper right to the lower left as seen in FIG. 3.

In this position, the baffle deflects the stream of viscous mixture from the spout 1 towards the lower left corner of the vat 2 from which it flows diagonally across the bottom of the vat in a direction transverse of the direction of flow of the material during the first position of the movable baffle 3. The baffle retains its position as long as the cam follower 14 slidably engages the larger semi-cylindrical face portion of the cam disc 13. When the cam follower 14 reaches the end of the larger semi-cylindrical cam face portion, it is swung again to the right by the weight 20 and the movable baffle 3 returns to its first position in which it directs the stream of viscous mixture towards the lower right corner of the vat 2 as seen in FIG. 3. Since the cam disc 13 rotates once for each turn of the cast iron roll 9, the movable baffle 3 is held in one of its two positions, indicated in full lines in FIG. 5, during an entire revolution of the roll 9 and in the other position, indicated in broken lines in FIG. 5, during the subsequent revolution of the roll 9.

The elongated asbestos fibers of the mixture of which the coating built up on the roll 9 is composed, are oriented by the flow of the stream across the bottom of the vat 2 alternatingly in a diagonal direction from the lower right to the upper left as seen in FIG. 2 and from the lower left to the upper right. This orientation is substantially maintained in the layer of material carried out of the vat and transferred by the revolving screen 6 to the belt 7 and finally deposited on the roll 9. Since the movable baffle 3 maintains each of its positions for a full turn of the roll 9, a sheet of asbestos cement is built up on the roll 9 from a large number of individual layers which are superimposed in such a manner that the asbestos fibers in each layer are preferentially aligned transversely to the asbestos fibers in the layers immediately above and below. The asbestos fibers thus are no longer uniformly aligned throughout the thickness of the sheet and the product obtained has substantially the same mechanical properties in all directions.

Figure 4:
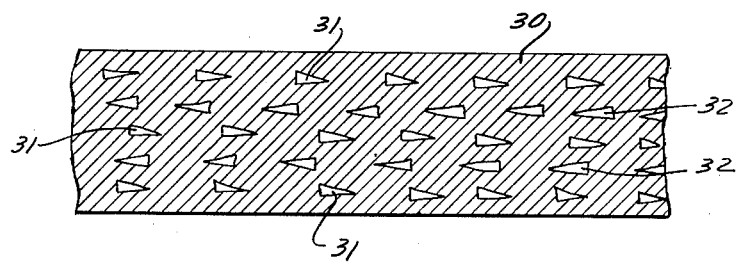
FIG. 4 is a fragmentary cross-sectional view of a sheet produced on the apparatus of FIG. 1.
Figure 5:
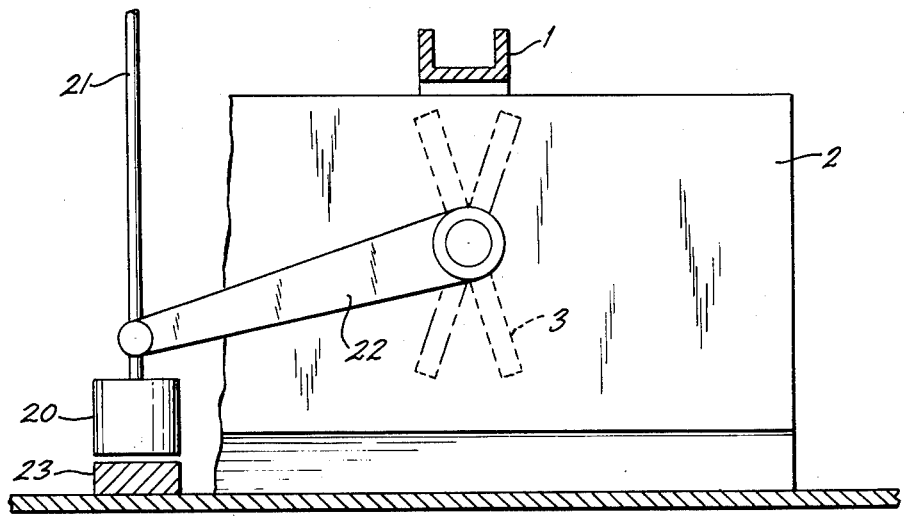
FIG. 5 is a fragmentary elevational end view of the apparatus shown in FIG. 1.
Figure 6:
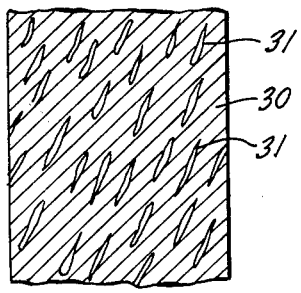
FIG. 6 is a fragmentary cross-sectional view of the sheet shown in FIG. 4, taken along line A—A.
Figure 7:
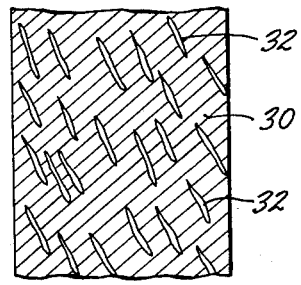
FIG. 7 is a fragmentary cross-sectional view of the sheet shown in FIG. 4, taken along line B—B.

Such a sheet is shown in fragmentary cross sections in FIGS. 4, 6 and 7, in which the cementitious matrix 30 is reinforced by alternating layers of asbestos fibers 31 and 32, oriented respectively in the plane of the cross section and substantially at right angles thereto. The different orientation of the fibers in alternating adjacent layers is further illustrated in FIGS. 6 and 7. This sheet may be corrugated in a press without developing cracks and is of superior resiliency and bending strength as compared to a sheet produced on a vat machine not equipped with the movable baffle of the invention in which the flow of the viscous mixture across the bottom of the vat is substantially parallel to the side walls and the asbestos fibers are preferentially oriented tangentially or circumferentially relative to the revolving screen and therefore also to the roll on which a plurality of layers is built up to form the final sheet.

It will be understood that each of the elements described above, or two or more together, may also find a useful application in other types of apparatus and methods for the production of cementitious structures differing from the types described above.

While the invention has been illustrated and described as embodied in so called "wet machine" for the production of asbestos-cement sheets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for producing fiber-reinforced cementitious structures, in combination, a container; means adjacent said container for introducing a stream of a viscous mixture of cementitious material and of elongated particles of fibrous material into said container so as to form therein a body of said mixture having particles of said fibrous material preferentially aligned in the direction of movement of said stream; baffle means reciprocably movable relative to said container between two angular positions thereof for changing the direction of movement of said stream at predetermined intervals, said stream moving in a first direction when said baffle means is in one of said positions thereof, and said stream moving in a second direction transverse of said first direction, when said baffle means is in the other one of said positions thereof; a rotatable sheet-forming cylinder mounted a predetermined distance from said container; means for withdrawing a continuous elongated layer of said mixture from said body thereof in said container, said layer having a plurality of longitudinally consecutive portions withdrawn from said body during respective ones of said intervals, and for depositing said portions on said cylinder; and means for actuating movement of said direction-changing means and rotation of said cylinder in such a manner as to superimpose contiguously consecutive ones of said portions on said cylinder.

2. In an apparatus for producing fiber-reinforced cementitious structures, in combination, a container; means adjacent said container for introducing a stream of a viscous mixture of cementitious material and of elongated particles of fibrous material into said container so as to form therein a body of said mixture having particles of said fibrous material preferentially aligned in the direction of movement of said stream; baffle means reciprocably movable relative to said container between two angular positions thereof for changing the direction of movement of said stream at predetermined intervals, said stream moving in a first direction when said baffle means is in one of said positions thereof, and said stream moving in a second direction transverse of said first direction, when said baffle means is in the other one of said positions thereof; a rotatable sheet-forming cylinder mounted a predetermined distance from said container; means for withdrawing a continuous elongated layer of said mixture from said body thereof in said container, said layer having a plurality of longitudinally consecutive portions withdrawn from said body during respective ones of said intervals, and for depositing said portions on said cylinder; and means for actuating movement of said direction-changing means at said predetermined intervals and rotation of said cylinder through one turn during each of said intervals whereby contiguously consecutive ones of said portions are superimposed on said cylinder.

References Cited in the file of this patent

UNITED STATES PATENTS

| | | |
|---|---|---|
| 1,268,929 | Conniff | June 11, 1918 |
| 1,530,630 | Tucker | Mar. 24, 1925 |
| 1,544,843 | Ledeboer | July 7, 1925 |
| 1,771,600 | Yoder | July 29, 1930 |
| 2,037,243 | Kutter | Apr. 14, 1936 |
| 2,044,786 | Harshberger | June 23, 1936 |
| 2,200,268 | Ferla | May 14, 1940 |
| 2,216,817 | Kutter | Oct. 8, 1940 |
| 2,364,061 | Ferla | Dec. 5, 1944 |
| 2,839,812 | Berliner | June 24, 1958 |

FOREIGN PATENTS

| | | |
|---|---|---|
| 823,527 | Great Britain | Nov. 11, 1959 |